United States Patent
Liu et al.

(10) Patent No.: US 12,518,497 B2
(45) Date of Patent: Jan. 6, 2026

(54) MODEL ALIGNMENT METHOD

(71) Applicant: Hong Kong Centre for Logistics Robotics Limited, New Territories (HK)

(72) Inventors: Yunhui Liu, New Territories (HK); Xueyan Tang, New Territories (HK)

(73) Assignee: Hong Kong Centre for Logistics Robotics Limited, New Territories (HK)

( * ) Notice: Subject to any disclaimer, the term of this patent is extended or adjusted under 35 U.S.C. 154(b) by 266 days.

(21) Appl. No.: 18/335,204

(22) Filed: Jun. 15, 2023

(65) Prior Publication Data
US 2024/0362875 A1  Oct. 31, 2024

Related U.S. Application Data (63) Continuation of application No. PCT/IB2023/054415, filed on Apr. 28, 2023.

(51) Int. Cl.
  *G06T 7/33* (2017.01)
  *G06T 7/13* (2017.01)
  (Continued)

(52) U.S. Cl.
  CPC ............... *G06T 19/20* (2013.01); *G06T 7/13* (2017.01); *G06T 7/60* (2013.01);
  (Continued)

(58) Field of Classification Search
  CPC .. G06T 19/20; G06T 7/13; G06T 7/60; G06T 2207/10028; G06T 2210/56;
  (Continued)

(56) References Cited

U.S. PATENT DOCUMENTS

| | | | |
|---|---|---|---|
| 6,549,651 B2 | 4/2003 | Xiong | |
| 2014/0067106 A1* | 3/2014 | Makeig | B29C 64/386 700/98 |
| 2022/0156977 A1* | 5/2022 | Nakano | G06T 3/08 |

FOREIGN PATENT DOCUMENTS

| | | | | |
|---|---|---|---|---|
| CN | 102066980 A | * | 5/2011 | G01V 1/345 |
| CN | 107680125 A | * | 2/2018 | G06T 19/00 |

(Continued)

OTHER PUBLICATIONS

PCT International Search Report, PCTIB2023/054415, Issued Jan. 8, 2024.

(Continued)

*Primary Examiner* — Said Broome
*Assistant Examiner* — Denis Vasiliy Minko
(74) *Attorney, Agent, or Firm* — Hinckley Allen & Snyder; Stephen Holmes (57) ABSTRACT

A computer-implemented method of aligning a source model with a target model includes receiving the source model and the target model, identifying geometric features in each of the source model and target model, assigning a feature vector to each feature, defining an associated geometry type, position, direction and magnitude for the feature, pairing each feature vector in the source model with each other feature vector in the source model and pairing each feature vector in the target model with each other feature vector in the target model, calculating a pair vector for each pairing, defining the geometry type of each feature vector in the pairing, the dimension of each feature vector in the pairing, a relative orientation and separation distance, identifying matching pair vectors between the source model and target model; and calculating a transformation matrix between the source model and target model based on the matching pair vectors.

14 Claims, 9 Drawing Sheets

(51) Int. Cl.
*G06T 7/60* (2017.01)
*G06T 19/20* (2011.01)
*G06V 10/44* (2022.01)
*G06V 10/75* (2022.01)

(52) U.S. Cl.
CPC .............. *G06T 2207/10028* (2013.01); *G06T 2210/56* (2013.01); *G06T 2219/2004* (2013.01)

(58) Field of Classification Search
CPC ... G06T 2219/2004; G06T 7/33; G06V 10/44; G06V 10/75; G06V 20/653
See application file for complete search history.

(56) References Cited

FOREIGN PATENT DOCUMENTS

| | | | | | |
|---|---|---|---|---|---|
| CN | 108564605 | A | * | 9/2018 | ............... G06T 7/30 |
| CN | 109785283 | A | * | 5/2019 | |
| CN | 112507247 | A | * | 3/2021 | ............. G06Q 50/01 |
| CN | 112581515 | A | | 3/2021 | |
| CN | 114581519 | A | | 6/2022 | |
| CN | 114998097 | A | * | 9/2022 | ............. G06T 7/136 |
| WO | 2023024443 | A1 | | 3/2023 | |

OTHER PUBLICATIONS

PCT International Written Opinion, PCTIB2023/054415, Issued Jan. 8, 2024.

\* cited by examiner

MODEL ALIGNMENT METHOD

FIELD OF THE DISCLOSURE

The present disclosure relates to three dimensional modelling and, in particular, to the alignment of a source model with a target model without an external frame of reference.

BACKGROUND OF THE DISCLOSURE

In many situations it is beneficial to align two three-dimensional (3D) models that have an unknown relative orientation. For example, it is difficult to perform a 3D full-dimension measurement and assessment of surface defects for complex mechanical components, and a technique of comparative measurement is often used. A 3D scanner is used to generate an actual model of the component which can be compared with a scanned model of another component or a template model, e.g. a design model generated using computer-aided design (CAD) software. Dimension errors and surface defects can be found in the model differences using this technique, however, the models must be precisely aligned and the rotation and translation between the template model and the actual model are generally unknown.

U.S. Pat. No. 8,830,229B2 describes a "point pair feature" (PPF) method for aligning a template model and an actual model. Both the template model and the actual model are sampled and represented by discrete points with a point direction normal to the surface at that point, and the template model is described using PPFs which define the relative position and orientation of every pair of points in the model. The PPFs for the template model are stored in a hash table, such that one or more PPFs of the actual model can be used to search the hash table to find similar PPFs from the template model.

Each point pair from the actual model is transformed by translating a first one of the points to the coordinate origin and then rotating to make the point direction aligned with the reference axis, e.g. the x-axis, and a point pair from the template model with a similar PPF is transformed by translating a first one of the points to the coordinate origin and then rotating to make the point direction aligned with the reference axis, e.g. the x-axis. A rotation angle $\alpha$ is computed between the two transformed PPFs, such that a series of the rotation angles are computed, and the angle $\alpha$ having the most votes can be found via a voting scheme, to calculate a transformation matrix from one point pair in the actual model to one corresponding point pair in the template model.

There are a lot of transformation matrices, so the transformation matrices are clustered and the average matrix of the most common cluster is taken as the transformation matrix from the actual model to the template model.

This method has limitations for planar or smooth surfaces, e.g., if the two points are from one plane the PPF has three ambiguous angles. To solve this problem, a boundary point-to-boundary point (B2B) feature using only boundary points is described in Choi, 2012.

However, even using the B2B feature, there can still be a wrong alignment problem, e.g. for generally symmetric models with small asymmetric features. If all the boundary points are considered equally, the alignment result may be wrong because most points are aligned well but the small asymmetric features are not. Thus, the points in the small asymmetric features are more important and the misalignment problem can be solved by assigning proper weights to points or features. U.S. Pat. No. 9,280,827B2 describes a learning-based weighting method, however, a lot of 3D data is captured for the actual models, and the poses must be labelled as the input for training the network, so there is a lot of effort required to train the network.

It is an object of the present disclosure to provide a model alignment method which overcomes these problems.

SUMMARY OF THE DISCLOSURE

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect of the present disclosure, there is provided a computer-implemented method of aligning a source model with a target model, including receiving the source model and the target model; identifying a plurality of geometric features in each of the source model and target model; assigning a feature vector to each feature, defining an associated geometry type, position, direction and magnitude for the feature; pairing each feature vector in the source model with each other feature vector in the source model and pairing each feature vector in the target model with each other feature vector in the target model; calculating a pair vector for each of said pairings, defining the geometry type of each feature vector in the pairing, the dimension of each feature vector in the pairing, a relative orientation and separation distance; identifying one or more matching pair vectors between the source model and target model; and calculating a transformation matrix between the source model and target model based on the matching pair vectors.

At least one of the source model and target model may be a point cloud model.

Identifying geometric features in the point cloud model may include assigning a local geometry to each point and grouping nearby points with the same local geometry.

At least one of the source model and target model may be a 3D solid model.

Identifying geometric features in the 3D solid model may include detecting a plurality of edges, sampling each edge to generate a plurality of edge points, assigning a local geometry to each edge point and grouping nearby edge points with the same local geometry.

The local geometry for each point may be calculated using a plurality of nearby points within a predetermined radius.

Identifying geometric features in the 3D solid model may include detecting a plurality of edges and identifying one or more surfaces delimited by the detected edges.

Identifying geometric features in a model may include dividing the model into a plurality of voxels, analysing the distribution of the model within each voxel, determining a local geometry for each voxel based on the distribution of the model in that voxel and each neighbouring voxel, applying the determined local geometry for each voxel to a region of the model within that voxel, and grouping one or more nearby regions of the model with same local geometry The steps of analysing the distribution of the model, determining the local geometry and applying the determined local geometry to a region of the model may be carried out for a plurality of voxels in parallel.

The geometry type may be selected from: 3D point, 3D line, 3D circle, 3D plane, 3D arbitrary surface, 3D object.

The corresponding dimension may be null for a 3D point, length for a 3D line, diameter for a 3D circle, and area or width/length ratio for a 3D plane, 3D arbitrary surface or 3D object.

Calculating the transformation matrix may include iterating the steps of: selecting a plurality of sets of matched pairs at random, calculating a candidate transformation matrix for the selected matched pairs, applying the candidate transformation matrix to each other matched pair, and determining a correspondence number for the candidate transformation matrix by counting the number of matched pairs that fall within a tolerance threshold after application of the candidate transformation matrix; terminating the iteration after a predetermined condition is reached; and selecting the candidate transformation matrix with the highest correspondence number as the output transformation matrix.

The candidate transformation matrix may be an average of transformation matrices calculated for each of the plurality of selected matched pairs.

The predetermined condition may be a threshold correspondence number, or a fixed number of completed iterations.

The source model may be an actual model based on real-word data.

The target model may be a template model based on a computer generated template or a second actual model based on further real-world data.

In accordance with a second aspect of the present disclosure, there is provided a data processing apparatus comprising a processor configured to align a source model with a target model by receiving the source model and the target model; identifying a plurality of geometric features in each of the source model and target model; assigning a feature vector to each feature, defining an associated geometry type, position, direction and magnitude for the feature; pairing each feature vector in the source model with each other feature vector in the source model and pairing each feature vector in the target model with each other feature vector in the target model; calculating a pair vector for each of said pairings, defining the geometry type of each feature vector in the pairing, the dimension of each feature vector in the pairing, a relative orientation and separation distance; identifying one or more matching pair vectors between the source model and target model; and calculating a transformation matrix between the source model and target model based on the matching pair vectors.

In accordance with a third aspect of the present disclosure, there is provided a computer-readable medium comprising instructions which, when executed by a processor, cause the processor to align a source model with a target model by receiving the source model and the target model; identifying a plurality of geometric features in each of the source model and target model; assigning a feature vector to each feature, defining an associated geometry type, position, direction and magnitude for the feature; pairing each feature vector in the source model with each other feature vector in the source model and pairing each feature vector in the target model with each other feature vector in the target model; calculating a pair vector for each of said pairings, defining the geometry type of each feature vector in the pairing, the dimension of each feature vector in the pairing, a relative orientation and separation distance; identifying one or more matching pair vectors between the source model and target model; and calculating a transformation matrix between the source model and target model based on the matching pair vectors.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended Figures. Understanding that these Figures depict only exemplary embodiments of the disclosure and are not therefore to be considered to be limiting of its scope, the principles herein are described and explained with additional specificity and detail through the use of the accompanying Figures.

Preferred embodiments of the present disclosure will be explained in further detail below by way of examples and with reference to the accompanying Figures, in which:—

DETAILED DESCRIPTION OF THE PREFERRED EMBODIMENTS

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Figure 1:
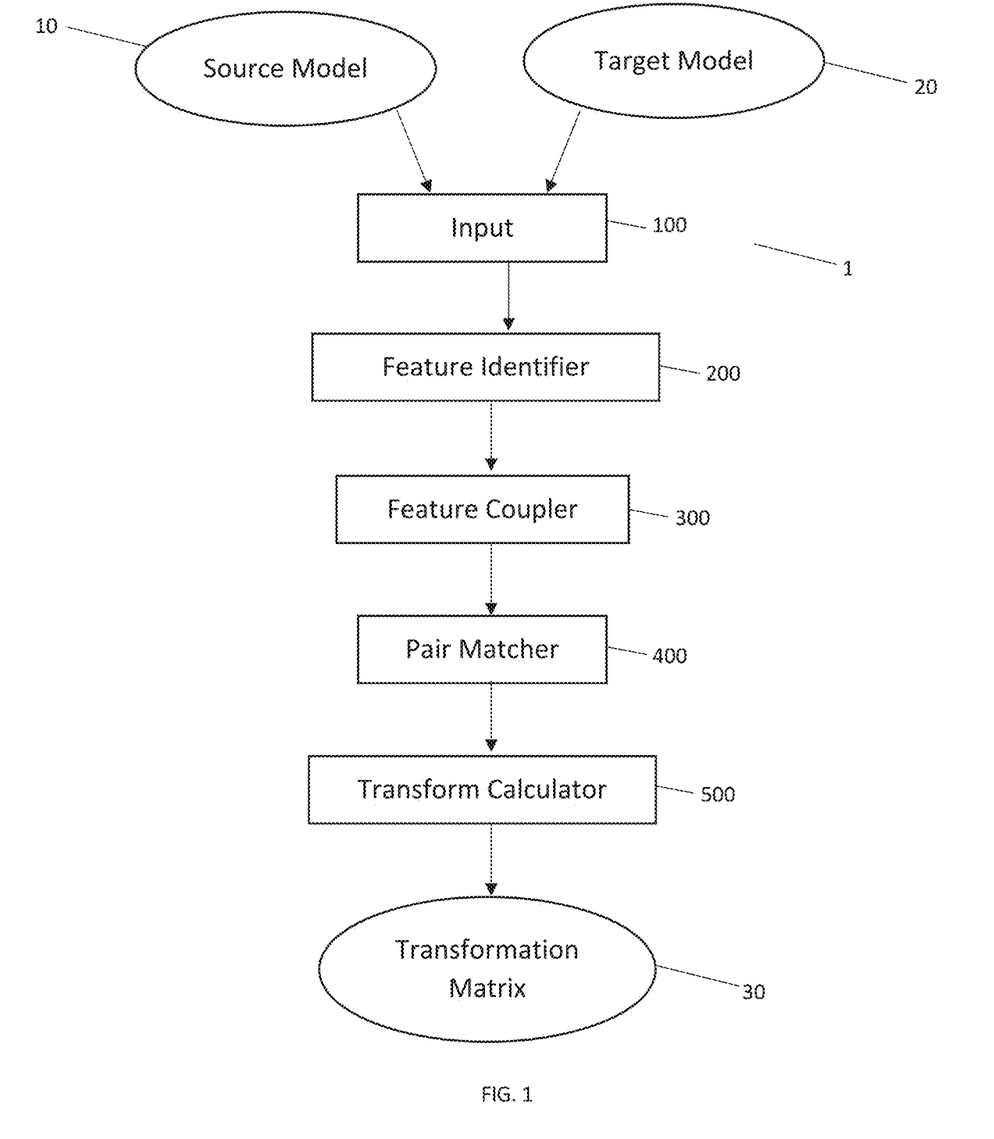
FIG. 1 shows a data processing apparatus according to an embodiment.

Referring to the drawings, there is shown in FIG. 1 a data processing apparatus 1 for aligning a source model 10 with a target model 20. The data processing apparatus 1 comprises an input 100, a feature identifier 200, a feature coupler 300, a pair matcher 400, and a transform calculator 500.

The input 100 is configured to receive a source model 10 and a target model 20. In some examples, at least one of the source model 10 and target model 20 may be a point cloud model. For example, the source model 10 and/or the target model 20 may be an actual model based on real-word data e.g. where a 3D scanner may used to generate an actual model of a complex mechanical component. In some examples, the data processing apparatus 1 may be configured to align the models to perform a repeatability check on multiple real-world components.

In some examples, at least one of the source model 10 and target model 20 may a 3D solid model. For example, the source model 10 and/or the target model 20 may be a template model based on a computer generated template e.g. generated using computer-aided design (CAD) software. The data processing apparatus may be configured to align the models to compare the different between a real-world component and a corresponding design model.

The feature identifier 200 is configured to identify a plurality of geometric features in each of the source model 10 and target model 20. The geometric features may be a 3D point, 3D line, 3D circle, 3D plane or flat surface, 3D smooth surface, 3D object or any other suitable feature. In some examples, features may be overlapping, i.e. a point or region of the model may be assigned to multiple features.

Figure 2:
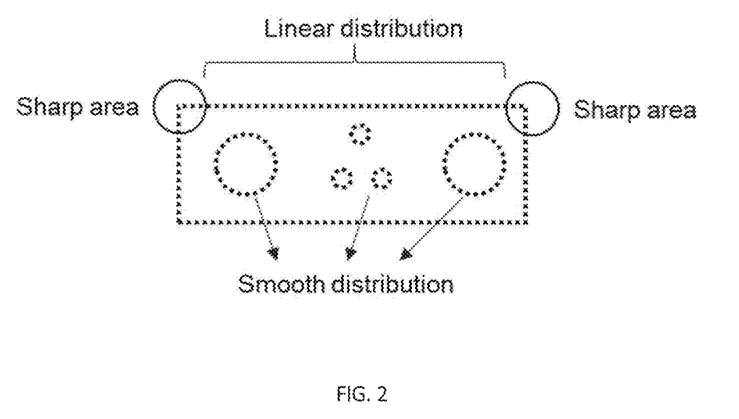
FIG. 2 illustrates examples of geometric features.

FIG. 2 shows an example point grouping of similar geometric features. Points having linear distribution, smooth distribution and a sharp change may be grouped respectively. Edge points may then be detected in the sharp change group, lines may be extracted in the linear group and circles may be extracted from the smooth distribution group.

For a point cloud model, the feature identifier 200 may be configured to assign a local geometry to each point and group nearby points with the same local geometry. The local geometry for each point may be calculated using a plurality of nearby points within a predetermined radius For a 3D solid model, the feature identifier 200 may be configured to detect a plurality of edges. The feature identifier 200 may be configured to sample each edge to generate a plurality of edge points, assign a local geometry to each edge point and group nearby edge points with the same local geometry. The local geometry for each point may be calculated using a plurality of nearby points within a predetermined radius.

Alternatively, or in addition, the feature identifier 200 may be configured to identify one or more surfaces delimited by the detected edges.

In some examples, the feature identifier 200 may be configured to divide the model into a plurality of voxels.

Figure 3A:
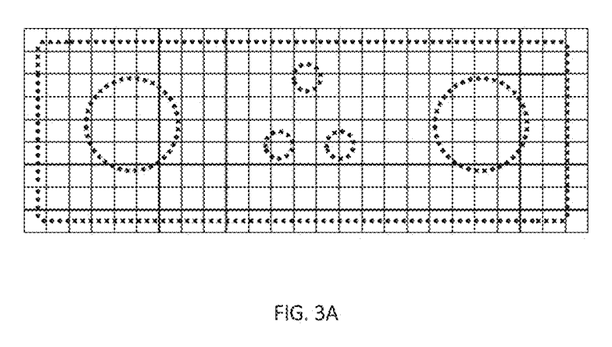
FIGS. 3A, 3B and 3C illustrate a process of identifying geometric features by voxelisation.

FIG. 3A shows an example model partitioned using voxels. A 2D or 3D space may be partitioned using voxels, according to the type of model.

The feature identifier 200 may be configured to analyse the distribution of the model within each voxel. In some examples, the feature identifier 200 may determine a local geometry for each voxel based on the distribution of the model in that voxel. In some examples, the feature identifier 200 may determine a local geometry for each voxel based on the distribution of the model in that voxel and each neighbouring voxel.

Figure 3B:
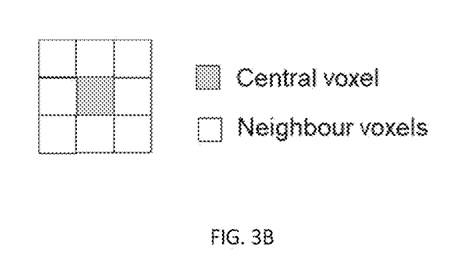

FIG. 3B shows the topology of a central voxel surrounded by neighbour voxels. In a 2D space a central voxel may be surrounded by 8 neighbour voxels. In a 3D space, a central voxel may be surrounded by 26 neighbour voxels. In some examples, the feature identifier 200 may determine a local geometry additionally based on second and/or third level neighbours.

Figure 3C:
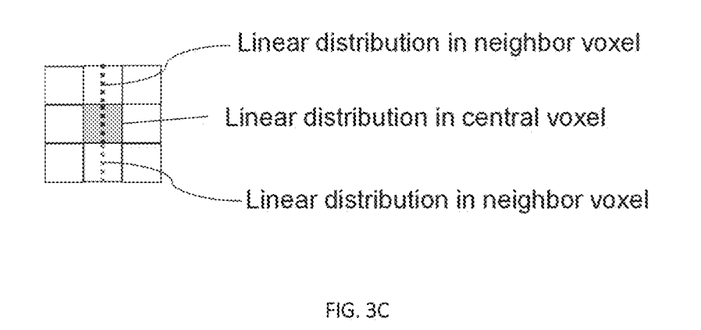

FIG. 3C shows an example where points in the central voxel have a linear distribution, and are collinear with two neighbour voxels which also have a liner distribution. Thus, it can be concluded that the three voxels form the same line geometry. The feature identifier 200 may determine that the local geometry of the central voxel is a line.

The feature identifier 200 may be configured to fit a line, plane, circle, smooth surface or any other suitable geometry in each voxel. The determined local geometry may be applied to the central voxel and may be different to the adjacent neighbour voxels, referring again to FIG. 3A it can be seen that voxels adjacent to the corner may be categorised as sharp area based on their neighbours despite being linear within the central voxel.

The feature identifier 200 may be configured to apply the determined local geometry for each voxel to a region of the model within that voxel. For example, the local geometry may be applied to the points of a point cloud model which fall within the voxel or a surface portion of the 3D solid model which lies within the voxel.

The feature identifier 200 may be configured to group one or more nearby regions of the model with same local geometry. Regions may be grouped according to a number of criteria, for example, that the points or surface portions belong to connected voxels and/or have a similar determined local geometry. For a line candidate the feature identifier 200 may require that points are collinear. For a plane candidate the feature identifier 200 may require the points or surface portions are coplanar. For a circle candidate the feature identifier 200 may require that points have the similar angle gradient. For smooth surface segmentation, the feature identifier 200 may require that the points or surface portions have a smooth angle gradient.

By using this voxel-based method, it is not necessary to analyse every point in a point cloud model, or every sampled point in a 3D solid model. It is also not necessary to identify neighbouring points for each analysed point. As both of these processes are particularly time consuming, the voxel-based method can reduce the processing time for feature identification.

The feature identifier 200 may be configured to analyse the distribution of the model, determine the local geometry and apply the determined local geometry to a region of the model for a plurality of voxels in parallel. For example, the feature identifier 200 may exploit one or more multi-core processors to perform parallel processing of the voxels.

In this way, the feature identifier 200 using a voxel-based method can take advantage of parallel processing to further reduce the processing time for feature identification.

The feature identifier 200 is further configured to assign a feature vector to each feature, defining an associated geometry type, position, direction and magnitude for the feature. The feature vector may have 8 dimensions, arranged as (type, position, direction, magnitude). The geometry type may be selected from: 3D point, 3D line, 3D circle, 3D plane, 3D arbitrary surface, 3D object. The feature vector may use a preassigned value corresponding to each geometry type e.g. 0 for a 3D point, 1 for a 3D line, 2 for a 3D circle, 3 for a 3D plane, 4 for a 3D surface etc.

The corresponding dimension may be null for a 3D point, length for a 3D line, or diameter for a 3D circle.

Figure 4A:
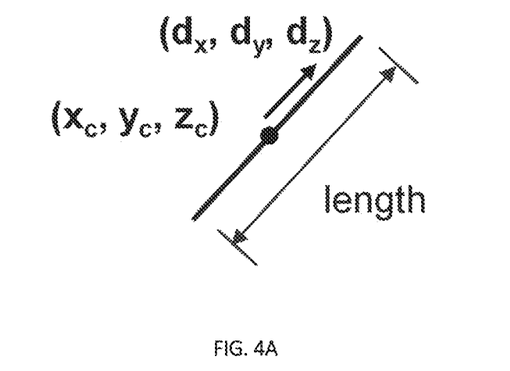
FIGS. 4A and 4B illustrate example feature vectors.

FIG. 4A shows an example 3D line feature. The 3D line may be defined as $(1, x_c, y_c, z_c, d_x, d_y, d_z, length)$, where $(x_c, y_c, z_c)$ is the line centre and $(d_x, d_y, d_z)$ is the line direction.

Figure 4B:
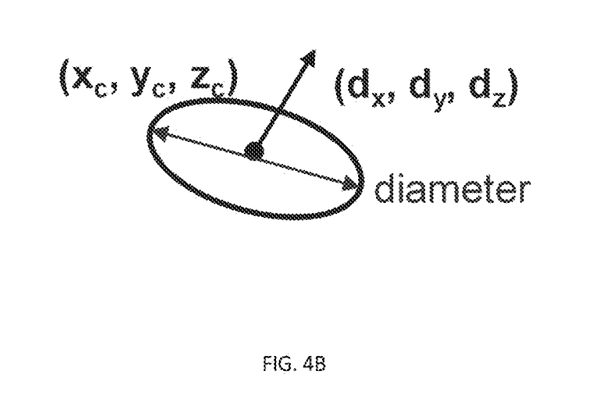

FIG. 4B shows an example 3D circle feature. The 3D circle may be defined as $(2, x_c, y_c, z_c, d_x, d_y, d_z, diameter)$, where $(x_c, y_c, z_c)$ is the circle centre and $(d_x, d_y, d_z)$ is direction perpendicular to the circle.

The corresponding dimension may be area or width/length ratio for a 3D plane, 3D arbitrary surface or 3D object. The choice to use area or width/length ratio may be made by a user or may be preconfigured in the feature identifier 200. For a non-planar surface, the area or width/length ratio of a bounding box may be used.

Figure 5A:
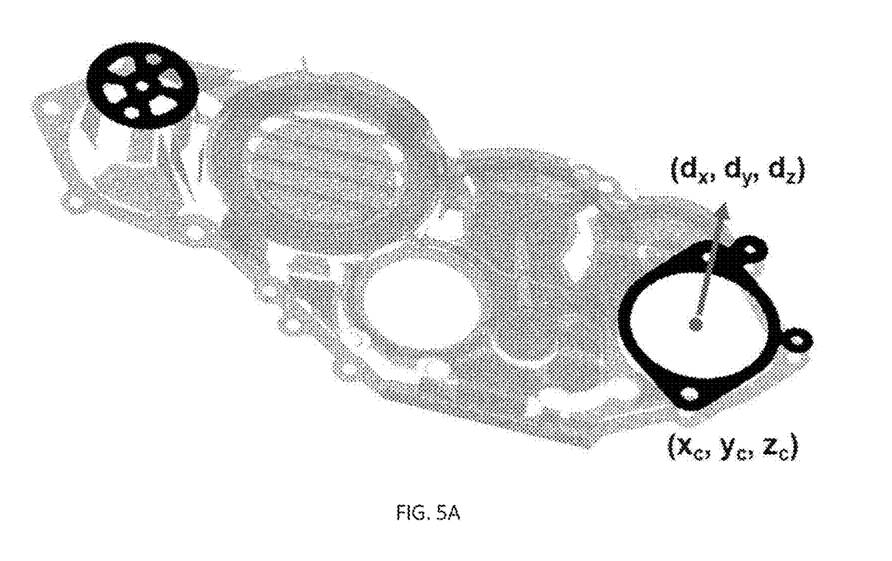
FIGS. 5A and 5B illustrate example feature vectors.

FIG. 5A shows an example 3D plane feature. The 3D plane may be defined as $(3, x_c, y_c, z_c, d_x, d_y, d_z, M)$, where $(x_c, y_c, z_c)$ is the plane centre and $(d_x, d_y, d_z)$ is a normal to the plane at the plane centre. The magnitude M may be the area or width/length ratio.

Figure 5B:
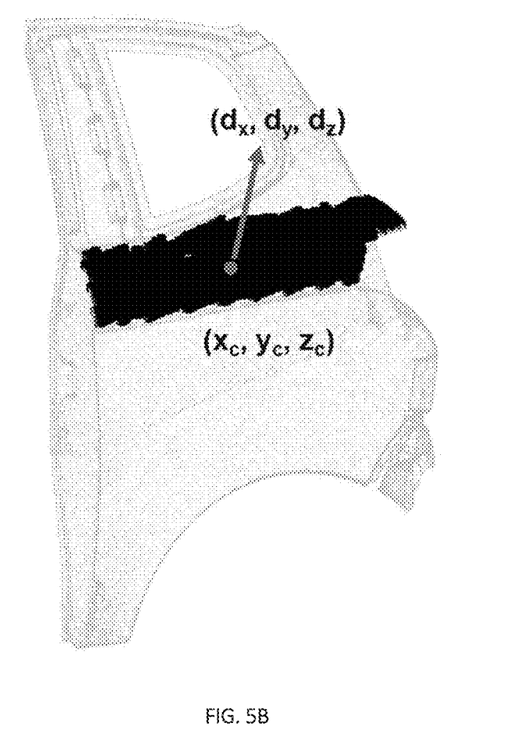

FIG. 5B shows an example 3D arbitrary surface feature. The 3D surface may be defined as $(4, x_c, y_c, z_c, d_x, d_y, d_z, M)$, where $(x_c, y_c, z_c)$ is the surface centre and $(d_x, d_y, d_z)$ is a normal to the surface at the surface centre. The magnitude M may be the area or width/length ratio of a bounding box.

The feature coupler 300 is configured to pair each feature vector in the source model 10 with each other feature vector in the source model 10 and pair each feature vector in the target model 20 with each other feature vector in the target model 20. The same geometry types may be paired, and different geometry types may be paired.

The feature coupler 300 is further configured to calculate a pair vector for each of said pairings, defining the geometry type of each feature vector in the pairing, the dimension of each feature vector in the pairing, a relative orientation and separation distance. The feature vector may have 8 dimensions, arranged as (type1, type 2, magnitude 1, magnitude 2, posture relationship). The posture relationship of one geometry pair may be described by the orientation and distance vector ($\alpha$, $\alpha_1$, $\alpha_2$, d), which uses the position and direction information of two geometries.

Figure 6A:
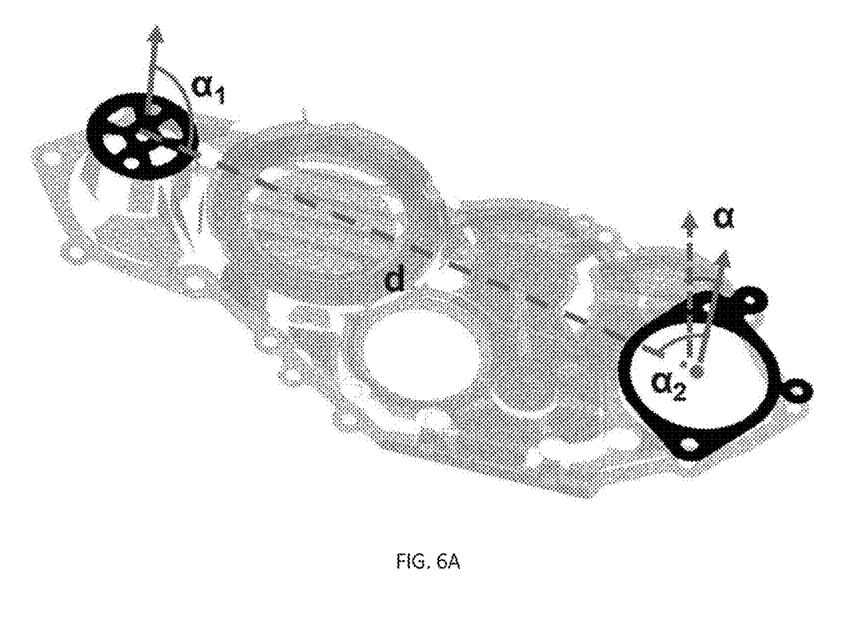
FIGS. 6A and 6B illustrate example feature pairs.

FIG. 6A shows an example plane-to-plane geometry pair. It can be seen that $\alpha$ is the angle between the normal directions ($d_x$, $d_y$, $d_z$) for each plane, $\alpha_1$ and $\alpha_2$ are the angles respectively between the normals of the first and second planes and a line connecting the centre points ($x_c$, $y_c$, $z_c$) for each plane, and d is the separation distance between the two plane centre points.

Figure 6B:
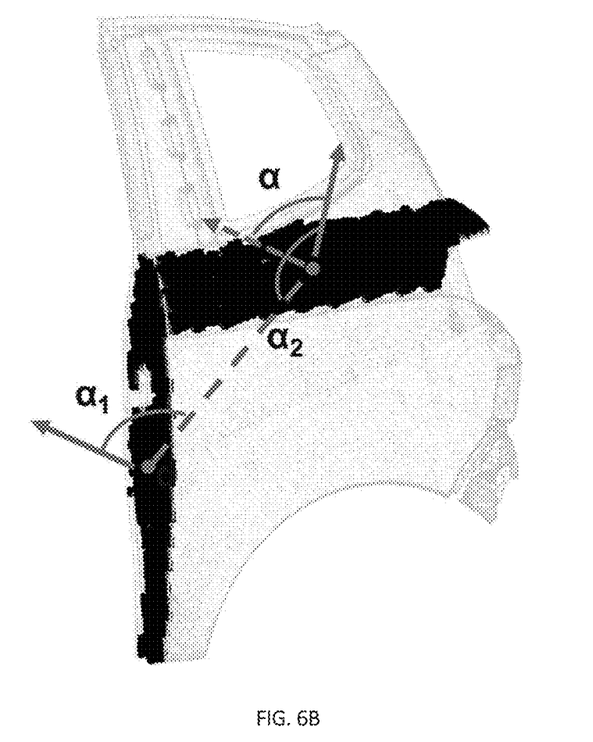

FIG. 6B shows an example surface-to-surface geometry pair. It can be seen that $\alpha$ is the angle between the normal directions ($d_x$, $d_y$, $d_z$) for each surface, $\alpha_1$ and $\alpha_2$ are the angles respectively between the normals of the first and second surfaces and a line connecting the centre points ($x_c$, $y_c$, $z_c$) for each surface, and d is the separation distance between the two surface centre points.

The pair matcher 400 is configured to identify one or more matching pair vectors between the source model 10 and target model 20.

The transform calculator 500 is configured to calculate a transformation matrix 30 between the source model 10 and target model 20 based on the matching pair vectors.

By using matching pair vectors, the processing to determine a suitable transformation matrix 30 can be significantly reduced, because the matching pairs of feature vectors are highly constrained. Whereas point pair features may have many incorrect matches and even complex individual geometries may not be unique or may be incorrectly matched based on symmetries, pairs of geometric features are less likely to be incorrectly matched. As such a lower number of pair vectors can be processed to determine the transformation matrix 30. In addition, the pairs of geometric features are more robust to noise that single points, so the accuracy of matching can be improved. Furthermore, the method can be applied generically to arbitrary shapes or types of models, as any suitable geometric features can be used to generate pairs.

In some examples, the transform calculator 500 may be configured to select a plurality of sets of matched pairs at random, calculate a candidate transformation matrix for the selected matched pairs and apply the candidate transformation matrix to each other matched pair. The candidate transformation matrix may be an average of transformation matrices calculated for each of the plurality of selected matched pairs. In this way, the processing required to calculate the transformation matrix 30 can be substantially reduced, because the matching pair vectors are more constrained, the transformation matrix 30 can be calculated accurately will a smaller subset of the total number of matched pairs.

The transform calculator 500 may be configured to determine a correspondence number for the candidate transformation matrix by counting the number of matched pairs that fall within a tolerance threshold after application of the candidate transformation matrix.

The transform calculator 500 may be configured to iterate these steps, terminating the iteration after a predetermined condition is reached. For example, the predetermined condition may be a threshold correspondence number, or a fixed number of completed iterations.

The transform calculator 500 may be configured to select the candidate transformation matrix with the highest correspondence number as the output transformation matrix 30.

Figure 7:
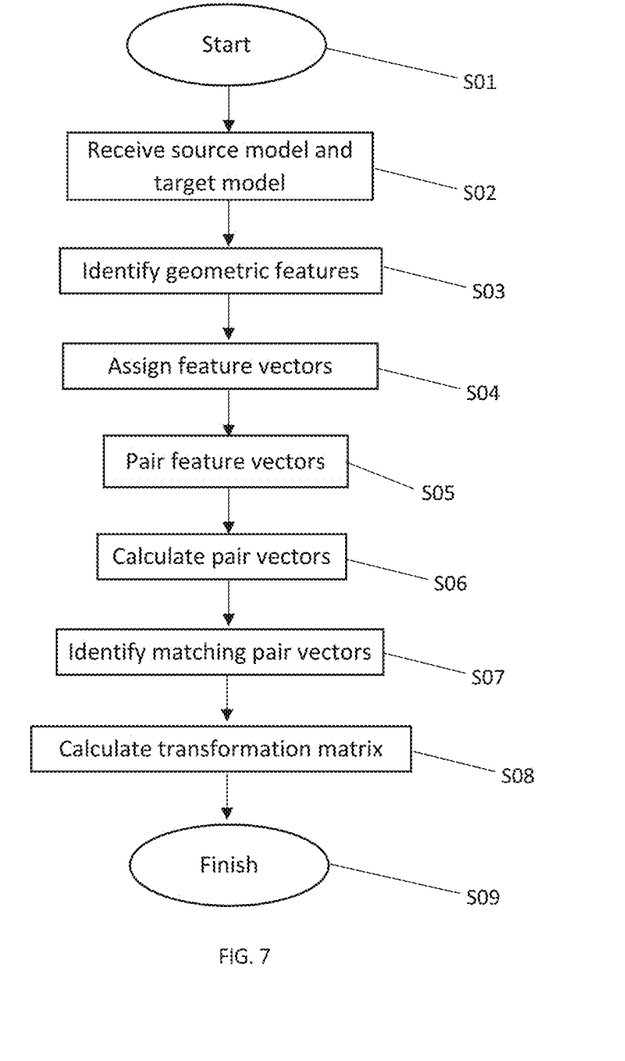
FIG. 7 shows a method of aligning a source model with a target model, according to an embodiment.

FIG. 7 shows a method of aligning a source model with a target model, according to an embodiment. The method starts at step S1.

At step S2, the source model and the target model are received.

At step S03, a plurality of geometric features are identified in each of the source model and target model.

At step S04, a feature vector is assigned to each feature, defining an associated geometry type, position, direction and magnitude for the feature.

At step S05, each feature vector in the source model is paired with each other feature vector in the source model. Each feature vector in the target model is paired with each other feature vector in the target model.

At step S06, a pair vector is calculated for each of said pairings, defining the geometry type of each feature vector in the pairing, the dimension of each feature vector in the pairing, a relative orientation and separation distance.

At step S07, one or more matching pair vectors are identified between the source model and target model.

At step S08, a transformation matrix is calculated between the source model and target model based on the matching pair vectors.

The method finishes at step S13.

The above embodiments are described by way of example only. Many variations are possible without departing from the scope of the disclosure as defined in the appended claims.

For clarity of explanation, in some instances the present technology may be presented as including individual functional blocks including functional blocks comprising devices, device components, steps or routines in a method embodied in software, or combinations of hardware and software.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method of aligning a source model with a target model, the method comprising:
   receiving the source model and the target model;
   identifying a plurality of geometric features in each of the source model and target model;
   assigning a feature vector to each feature, defining an associated geometry type, position, direction and magnitude for the feature;
   pairing each feature vector in the source model with each other feature vector in the source model and pairing each feature vector in the target model with each other feature vector in the target model;
   calculating a pair vector for each of said pairings, defining the geometry type of each feature vector in the pairing, the dimension of each feature vector in the pairing, a relative orientation and separation distance;
   identifying one or more matching pair vectors between the source model and target model; and
   calculating a transformation matrix between the source model and target model based on the matching pair vectors:
   wherein the geometry type is selected from: 3D point, 3D line, 3D circle, 3D plane, 3D arbitrary surface, 3D object; and
   where the corresponding dimension is null for a 3D point, length for a 3D line, diameter for a 3D circle, and area or width/length ratio for a 3D plane, 3D arbitrary surface or 3D object.

2. The computer-implemented method of claim 1, wherein at least one of the source model and target model is a point cloud model, and identifying geometric features in the point cloud model includes assigning a local geometry to each point and grouping nearby points with the same local geometry.

3. The computer-implemented method of claim 2, wherein the local geometry for each point is calculated using a plurality of nearby points within a predetermined radius.

4. The computer-implemented method of claim 1, wherein at least one of the source model and target model is a 3D solid model, and identifying geometric features in the 3D solid model includes detecting a plurality of edges, sampling each edge to generate a plurality of edge points, assigning a local geometry to each edge point and grouping nearby edge points with the same local geometry.

5. The computer-implemented method of claim 4, wherein the local geometry for each point is calculated using a plurality of nearby points within a predetermined radius.

6. The computer-implemented method of claim 1, wherein at least one of the source model and target model is a 3D solid model, and identifying geometric features in the 3D solid model includes detecting a plurality of edges and identifying one or more surfaces delimited by the detected edges.

7. The computer-implemented method of claim 1, wherein identifying geometric features in a model comprises dividing the model into a plurality of voxels, analyzing the distribution of the model within each voxel, determining a local geometry for each voxel based on the distribution of the model in that voxel and each neighboring voxel, applying the determined local geometry for each voxel to a region of the model within that voxel, and grouping one or more nearby regions of the model with same local geometry.

8. The computer-implemented method of claim 7, wherein the steps of analyzing the distribution of the model, determining the local geometry and applying the determined local geometry to a region of the model are carried out for a plurality of voxels in parallel.

9. The computer-implemented method of claim 1, wherein calculating the transformation matrix comprises:
   iterating the steps of:
      selecting a plurality of sets of matched pairs at random,
      calculating a candidate transformation matrix for the selected matched pairs,
      applying the candidate transformation matrix to each other matched pair, and
      determining a correspondence number for the candidate transformation matrix by counting the number of matched pairs that fall within a tolerance threshold after application of the candidate transformation matrix;
   terminating the iteration after a predetermined condition is reached; and
   selecting the candidate transformation matrix with the highest correspondence number as the output transformation matrix.

10. The computer-implemented method of claim 9, wherein the candidate transformation matrix is an average of transformation matrices calculated for each of the plurality of selected matched pairs.

11. The computer-implemented method of claim 9, where the predetermined condition is a threshold correspondence number, or a fixed number of completed iterations.

12. The computer implemented method of claim 1, wherein the source model is an actual model based on real-word data and the target model is a template model based on a computer-generated template, or a second actual model based on further real-world data.

13. A data processing apparatus comprising a processor configured to perform the computer-implemented method of claim 1.

14. A non-transitory computer-readable medium comprising instructions which, when executed by a processor, cause the processor to perform the method of claim 1.

* * * * *